(12) United States Patent
Finkenbinder et al.

(10) Patent No.: US 11,637,474 B2
(45) Date of Patent: Apr. 25, 2023

(54) THROUGHFLOW VACUUM MOTOR WITH REVERSE AIRFLOW

(71) Applicant: AMETEK, INC., Berwyn, PA (US)

(72) Inventors: David B. Finkenbinder, Shippensburg, PA (US); Robert A. Ciccarelli, Jr., Kent, OH (US)

(73) Assignee: Ametek, Inc., Berwyn, PA (US)

( * ) Notice: Subject to any disclaimer, the term of this patent is extended or adjusted under 35 U.S.C. 154(b) by 96 days.

(21) Appl. No.: 17/206,799

(22) Filed: Mar. 19, 2021

(65) Prior Publication Data

US 2022/0302793 A1     Sep. 22, 2022

(51) Int. Cl.
*H02K 5/20* (2006.01)
*H02K 9/06* (2006.01)

(52) U.S. Cl.
CPC ............... *H02K 5/207* (2021.01); *H02K 9/06* (2013.01)

(58) Field of Classification Search
CPC .. H02K 9/02; H02K 9/04; H02K 9/06; H02K 5/20; H02K 5/207
See application file for complete search history.

(56) References Cited

U.S. PATENT DOCUMENTS

| | | | |
|---|---|---|---|
| 2,888,192 A * | 5/1959 | Cole | A47L 5/22 55/467 |
| 3,303,996 A * | 2/1967 | Bayless | A47L 5/22 415/207 |
| 3,719,843 A | 3/1973 | Dochterman | |
| 4,184,804 A * | 1/1980 | Inagaki | F04D 29/5806 416/182 |
| 4,626,720 A * | 12/1986 | Fukasaku | H02K 9/06 310/227 |
| 4,839,547 A | 6/1989 | Lordo et al. | |
| 4,918,343 A | 4/1990 | Heinrich et al. | |
| 5,006,743 A | 4/1991 | King et al. | |
| 5,563,461 A | 10/1996 | Daniels | |
| 6,037,684 A * | 3/2000 | DeYoung | H02K 9/06 417/372 |
| 6,933,698 B2 | 8/2005 | Hirth | |
| 7,157,818 B2 | 1/2007 | Jones | |
| 7,541,701 B2 | 6/2009 | Lin et al. | |
| 7,732,955 B2 | 6/2010 | Miller et al. | |

(Continued)

FOREIGN PATENT DOCUMENTS

| | | |
|---|---|---|
| CN | 105790505 | 7/2016 |
| CN | 205725327 | 11/2016 |

(Continued)

*Primary Examiner* — Eric Johnson
(74) *Attorney, Agent, or Firm* — Renner Kenner Greive Bobak Taylor & Weber

(57) ABSTRACT

A throughflow motor assembly includes a motor assembly having a rotatable shaft and a housing with a motor assembly mounted to one end and a housing opening therethrough. A fan assembly is rotated by the rotatable shaft and received in the housing at an end opposite the motor assembly. The housing includes a partition which partitions the fan assembly and the motor assembly from one another, and includes at least one centrally located flow passage extending therethrough. The fan assembly draws air over the motor assembly, through the housing opening and at least one centrally located flow passage, and then into the fan assembly which exhausts the air.

19 Claims, 6 Drawing Sheets

(56) References Cited

U.S. PATENT DOCUMENTS

| | | |
|---|---|---|
| 7,988,538 B2 | 8/2011 | Trautner et al. |
| 8,519,582 B2 | 8/2013 | Leung et al. |
| 8,760,016 B2 | 6/2014 | Klafter et al. |
| 8,970,076 B2 | 3/2015 | Isoda et al. |
| 9,410,442 B2 | 8/2016 | Clothier et al. |
| 9,531,229 B2 | 12/2016 | Badafem et al. |
| 2013/0169082 A1 | 7/2013 | Jang et al. |
| 2018/0363679 A1* | 12/2018 | Johnson ................ F04D 29/667 |

FOREIGN PATENT DOCUMENTS

| | | |
|---|---|---|
| DE | 2952503 | 7/1980 |
| DE | 102009053988 | 5/2011 |
| GB | 2320818 | 11/1998 |
| JP | 58112433 | 7/1983 |
| JP | 59123443 | 7/1984 |
| JP | 2017135908 | 8/2017 |
| WO | 00/72740 | 12/2000 |

* cited by examiner

THROUGHFLOW VACUUM MOTOR WITH REVERSE AIRFLOW

TECHNICAL FIELD

The present invention is generally directed to vacuum motors. Specifically, the present invention is directed to throughflow vacuum motors with improved airflow properties.

BACKGROUND ART

It is known that throughflow vacuum motors conventionally draw unimpeded ambient air into an eye of an associated rotating fan. The air first passes through the fan, proceeds through a stationary diffuser, and then exits through the random geometry of the motor. Skilled artisans will appreciate that much of energy expended by the motor goes into moving the air through the motor assembly and that this air movement is degraded by heating of the air as it flows through the fan. The degradation primarily results from the fan blades impacting and then moving the ambient air. As a result of this configuration, the cooling air is pre-heated prior to passing over the motor. Moreover, the airflow is reduced through inlet restrictions to the eye of the rotating fan thereby increasing inefficiency substantially such that the heat from the fan system causes the motor to overheat and go into thermal runaway, thereby burning itself out if not thermally protected.

The advantages of simply reversing the airflow direction so that the air first goes through the motor is known in the art. As such, the air is not pre-heated before passing through the motor. Unfortunately, such designs were quickly abandoned because while the motor cooling was improved, the airflow efficiency and performance was greatly reduced. This was a result of the motor being in the path of the air that enters the eye of the fan, thus resulting in substantial air impedance. It was determined that the substantially lower performance of the motor assembly was not acceptable and did not outweigh the advantages of using a smaller motor because of the cooling advantages.

Therefore, there is a need in the art to solve the problem of the obstruction of the motor being in the path of the air that enters the eye of the fan. Simply stated, a need exists to place stationary blades near the fan entrance within a small intermediate space. There is a further need to provide a motor housing where after the air passes through the random geometry of the motor, the air is then stabilized and reoriented to minimize impedance loss and reduce blower inefficiencies in much the same way as motors that force air through the motor in the opposite direction. As a result of this need and the proposed solution, it is believed that higher efficiency air performance can be obtained while reducing the active material—the copper and steel of the motor—by 30 to 40%. It is believed that such an arrangement, which reduces the weight and cost of the motor, will also eliminate the need for a thermal protector since the motor is always exposed to cooler ambient incoming air. Further benefits may be obtained by the reduction of noise since the outlet allows for new airflow without the motor being in the way.

SUMMARY OF THE INVENTION

In light of the foregoing, it is a first aspect of the present invention to provide a throughflow vacuum motor with reverse airflow.

It is another aspect of the present invention to provide a throughflow motor assembly, comprising a motor assembly having a rotatable shaft, a housing having the motor assembly mounted to one end thereof, the housing having a housing opening therethrough, and a fan assembly rotated by the rotatable shaft and received in the housing at an end opposite the motor assembly, housing having a partition which partitions the fan assembly and the motor assembly from one another, the partition having at least one centrally located flow passage extending therethrough, the fan assembly drawing air over the motor assembly, through the housing opening and the at least one centrally located flow passage and then into the fan assembly which exhausts the air.

Yet another aspect of the present invention is a throughflow motor assembly, comprising a motor assembly having a shaft, a housing having the motor assembly carried at one end thereof, the housing having a housing opening therethrough, a fan assembly rotated by the shaft and carried by the housing at an end opposite the motor assembly, the housing having a partition which separates the fan assembly from the motor assembly in the housing, the partition having a passage therethrough, and a diffuser end plate connected to the housing and forming a fan chamber which receives the fan assembly, the diffuser end plate having a plurality of plate openings extending therethrough and disposed about an outer periphery thereof, wherein rotation of the fan assembly draws air over the motor assembly, through the housing opening, the passage and exhausts the air through the plurality of plate openings.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
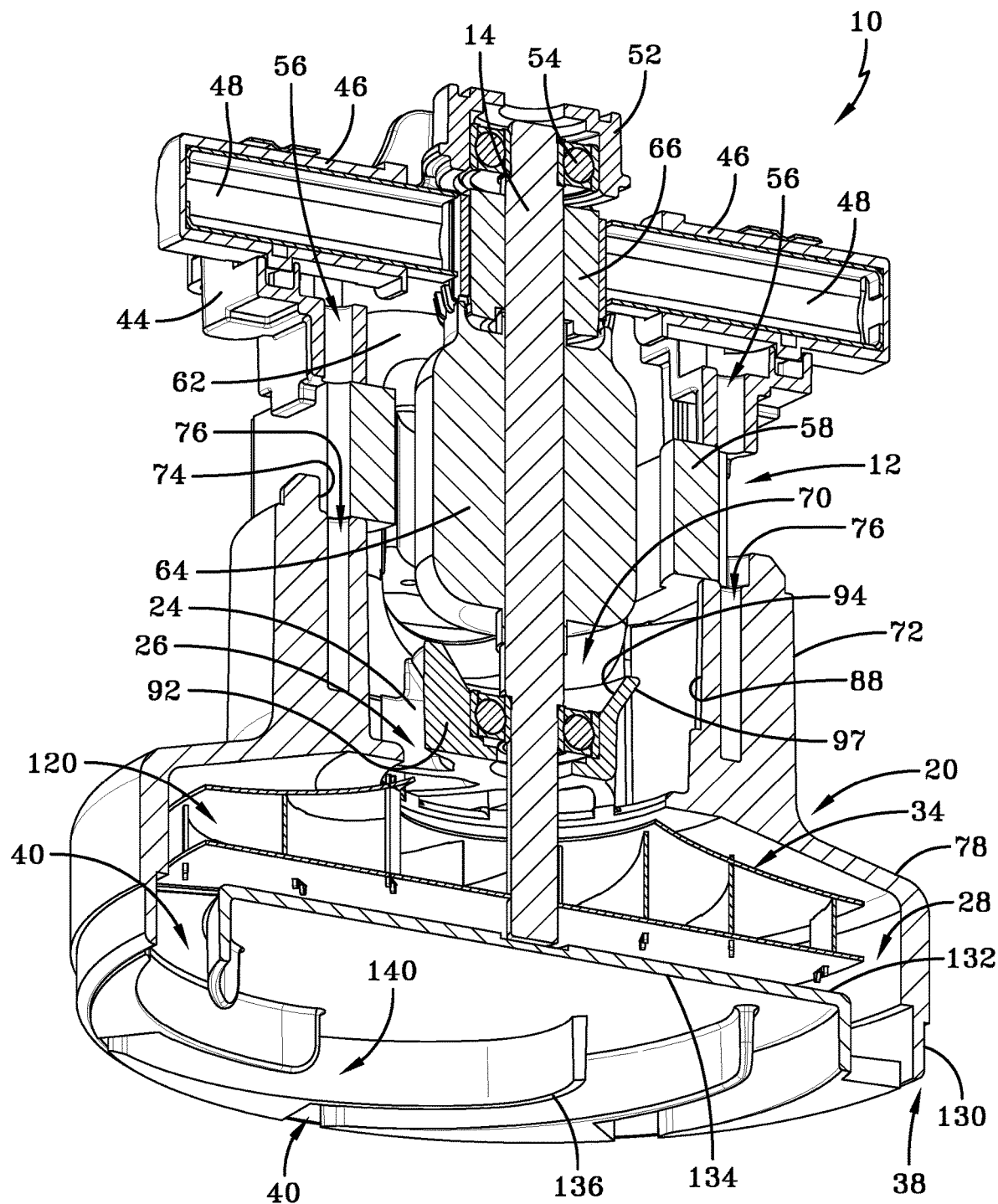
FIG. 1 is a side perspective view, in cross-section, of a throughflow vacuum motor with reverse airflow according to the concepts of the present invention.
Figure 2:
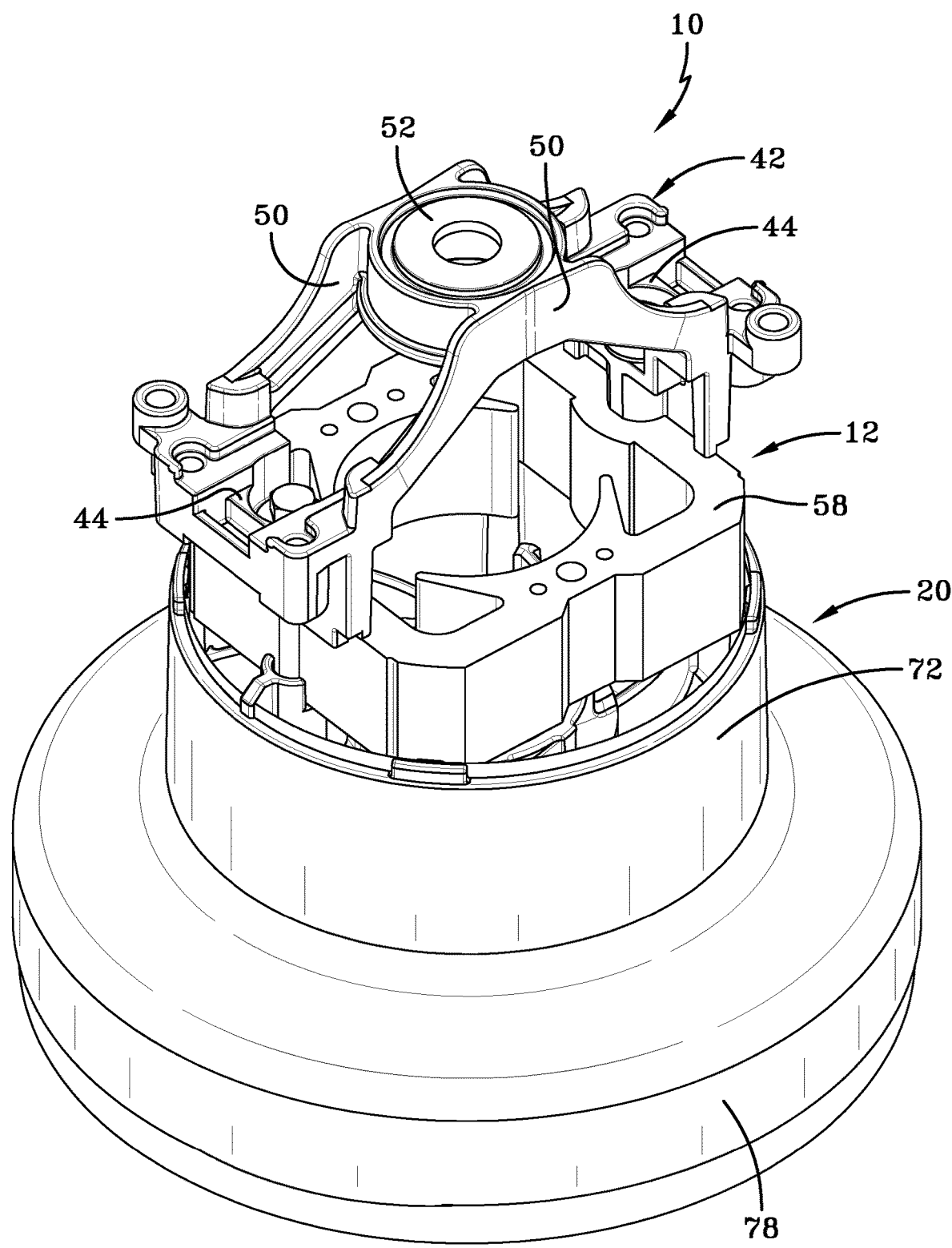
FIG. 2 is a top perspective view of the vacuum motor with selected portions of the vacuum motor removed according to the concepts of the present invention.

Referring now to FIGS. 1-4, it can be seen that a throughflow vacuum motor assembly is designated generally by the numeral 10. The assembly 10 draws in cooling air first through the motor by a fan assembly whereupon the air, which has now been heated by the motor assembly, is exhausted by the fan assembly. In particular, the assembly 10 includes a motor assembly 12 which has a rotatable shaft 14. The motor assembly 12 may be carried by a housing 20 which includes a plurality of internal guide vanes 24. The housing 20 includes a plurality of centrally located flow passages 26, wherein ambient air is directed through the flow passages into a fan chamber 28 formed by the housing 20. A tapered fan assembly 34, which is rotated by the shaft 14 and maintained within the housing 20, is configured so as to axially draw in the ambient air through the motor assembly 12 and then disperse the air radially within the fan chamber 28. A diffuser end plate 38 may be connected to the housing 20 at an end opposite the motor assembly 12 and may provide a plurality of plate openings 40 which extend therethrough. Accordingly, the cooling air drawn in through the motor assembly and then dispersed by the tapered fan assembly 34 is then directed out the plate openings 40. This configuration efficiently routes the ambient air through the housing after it has been heated by the motor assembly and then efficiently exhausts the heated air through the fan assembly and the diffuser end plate.

Referring now to FIGS. 1, 2, 4, and 5 it can be seen that the motor assembly 12 includes an end mount frame 42 which provides a pair of opposed brush supports 44. Each brush support carries a brush holder 46 wherein each brush holder may carry a brush 48 as is well understood in the art. Interconnecting each of the brush supports 44 are a pair of support brackets 50. Interconnecting the brackets 50 at about a midpoint and elevated above the motor assembly may be a frame bearing collar 52. The bearing collar 52 carries a bearing 54 which rotatably receives an end of the rotatable shaft 14. Extending through each of the brush supports 44 may be a fastener hole 56.

The motor assembly 12 includes a stator comprising stator laminations 58 upon which are wound stator windings 62. Received within the stator and stator windings is a rotor 64 from which axially extends a commutator 66. Both the rotor 64 and the commutator 66 are fixed to the shaft 14 in such a manner that the commutator is in electrical contact with the brushes 48.

The motor assembly 12 may be secured to the housing 20 by mounting the stator onto one end of the housing 20. The housing 20 provides for a housing opening 70 which extends axially therethrough. In particular, the housing 20 may include a mounting collar 72 which forms an upper portion of the housing and which forms a substantial portion of the housing opening. The mounting collar 72 may include a pair of mounting bosses 74, each of which has a fastener opening 76 extending into the housing. The fastener openings 76 are aligned with the fastener holes 56 so as to receive fasteners in such manner that the motor assembly 12 is secured to the housing 20.

Radially extending from the mounting collar 72 is a fan shell 78 which forms a lower portion of the housing 20. The fan shell 78 forms the fan chamber 28 so as to receive the tapered fan assembly 34. The fan chamber 28 is in fluid communication with the housing opening 70 so that cooling air may flow therethrough.

The mounting collar 72 includes an internal collar wall 88 which substantially forms the housing opening 70. A partition 90 extends transversely from the collar wall 88 and substantially separates the motor assembly 12 from the fan assembly 34. Additionally, the partition carries the internal vanes 24 which extend between the internal collar wall 88 and connect to a centrally located partition bearing collar 92. The collar 92 provides for an inwardly tapered surface 94. The collar 92 carries a bearing 96 which rotatably receives an opposite end of the shaft 14. In areas where the inner ends of the guide vanes 24 do not intersect with the bearing collar 92, an opposite side of the tapered surface 94 may form a radial contour surface 97. Skilled artisans will appreciate that the vanes 24 may extend from the collar wall 88 toward the bearing collar 92 in a manner that facilitates airflow through the assembly 10. In the embodiment shown, the guide vanes 24 are curvilinear and extend radially. In other embodiments, the vanes 24 may be straight or angled while still extending radially. And in other embodiments, the vanes 24 may include any combination of curvilinear, straight, spiral, helical, and/or angled components while fully or partially extending between the wall 88 and the bearing collar 92.

Figure 3:
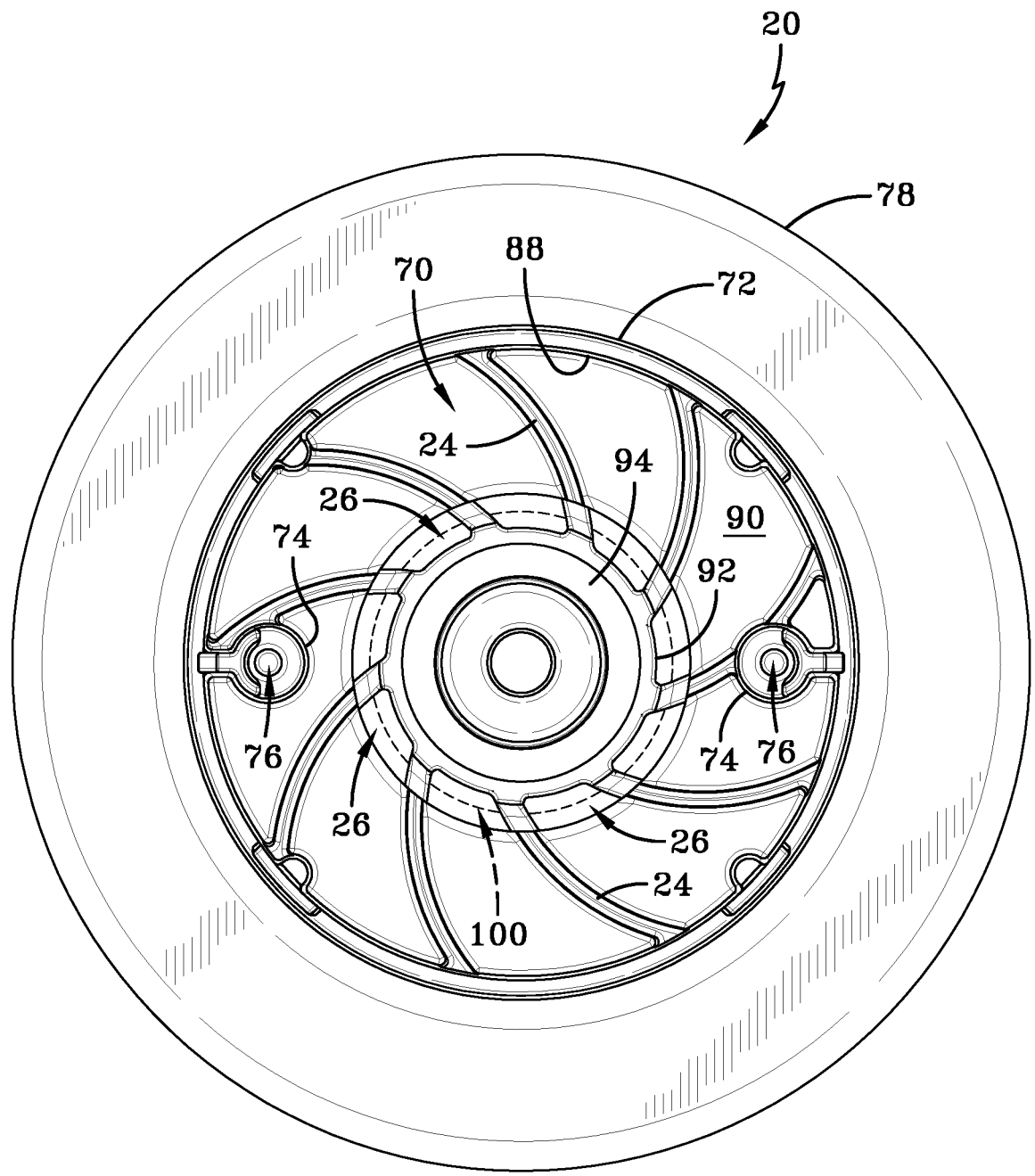
FIG. 3 is a top view of a housing used with the vacuum motor according to the concepts of the present invention.
Figure 4:
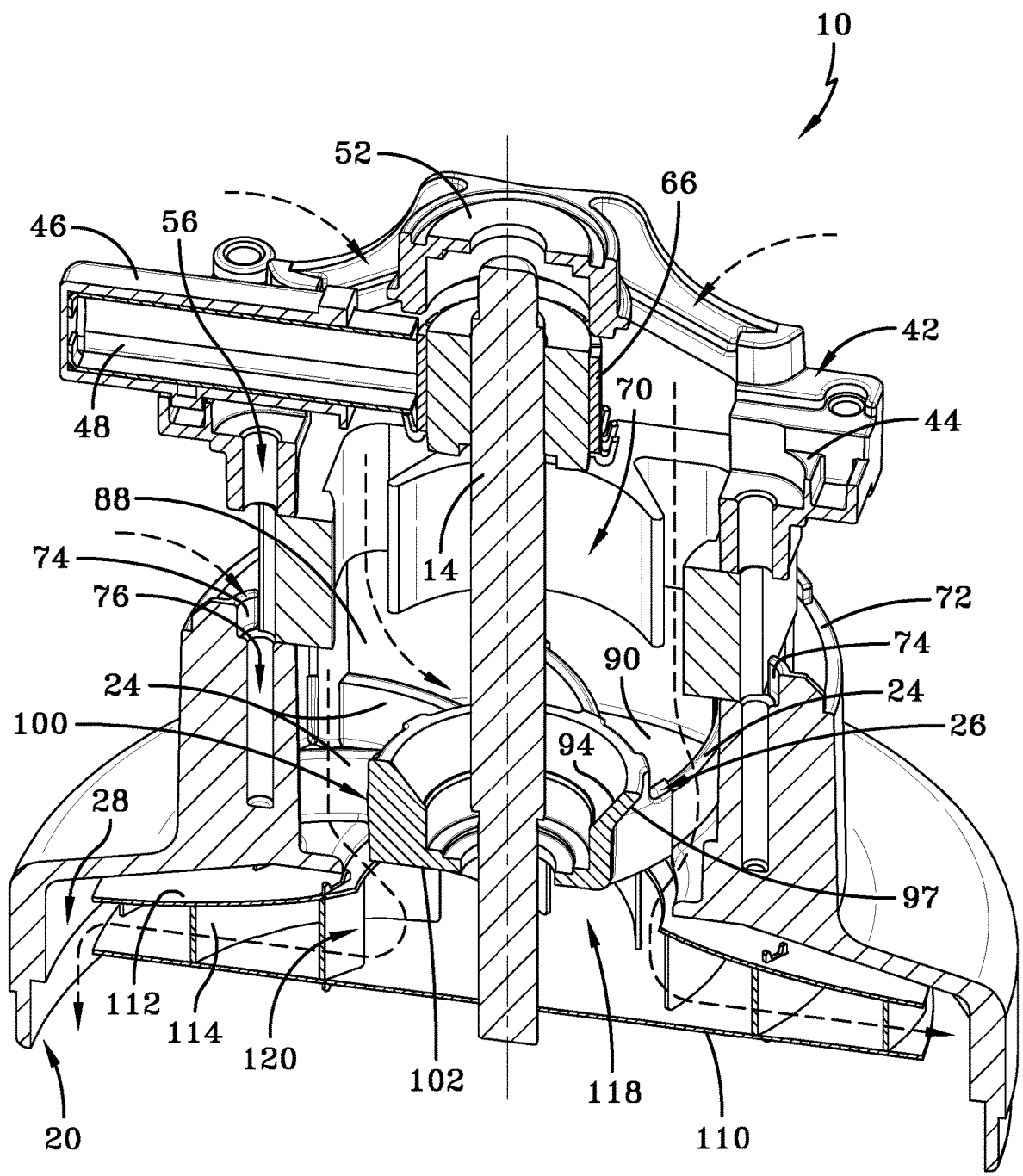
FIG. 4 is a partial perspective, cross-sectional view, of the throughflow vacuum motor with selected components removed so as to show airflow through the housing according to the concepts of the present invention.

Extending through the partition 90 are the plurality of centrally located flow passages 26 which are positioned substantially around the outer periphery of the partition bearing collar 92. The openings are interrupted or separated from one another by the internal guide vanes 24 which extend from the collar wall 88 all the way to the partition bearing collar 92. As best seen in FIGS. 3 and 4, the guide vanes 24 may be curvilinear and extend radially between the internal collar wall 88 and the partition bearing collar 92. Collectively, the guide vanes 24, which are adjacent to one another, the internal collar wall 88, the partition 90, and the tapered surface 94 form guide passages 99 that efficiently transfer airflow from the housing opening 70 to the flow passages 26. And the flow passages 26 form a segmented circular passage 100 which efficiently transfers airflow from the guide passages 99 into the fan chamber 28. The flow passages 26 and the resulting circular passage 100 direct the airflow somewhat axially through the partition 90 in a substantially cylindrical laminar flow around the shaft 14 and the partition bearing collar 92. As a result, air is drawn in by the fan assembly from the housing opening into the fan chamber 28 with minimal turbulence. Extending downwardly and axially from the partition collar 92 is an outer rim 102 which extends into the fan chamber 28 and further reduces the turbulence.

Figure 5:
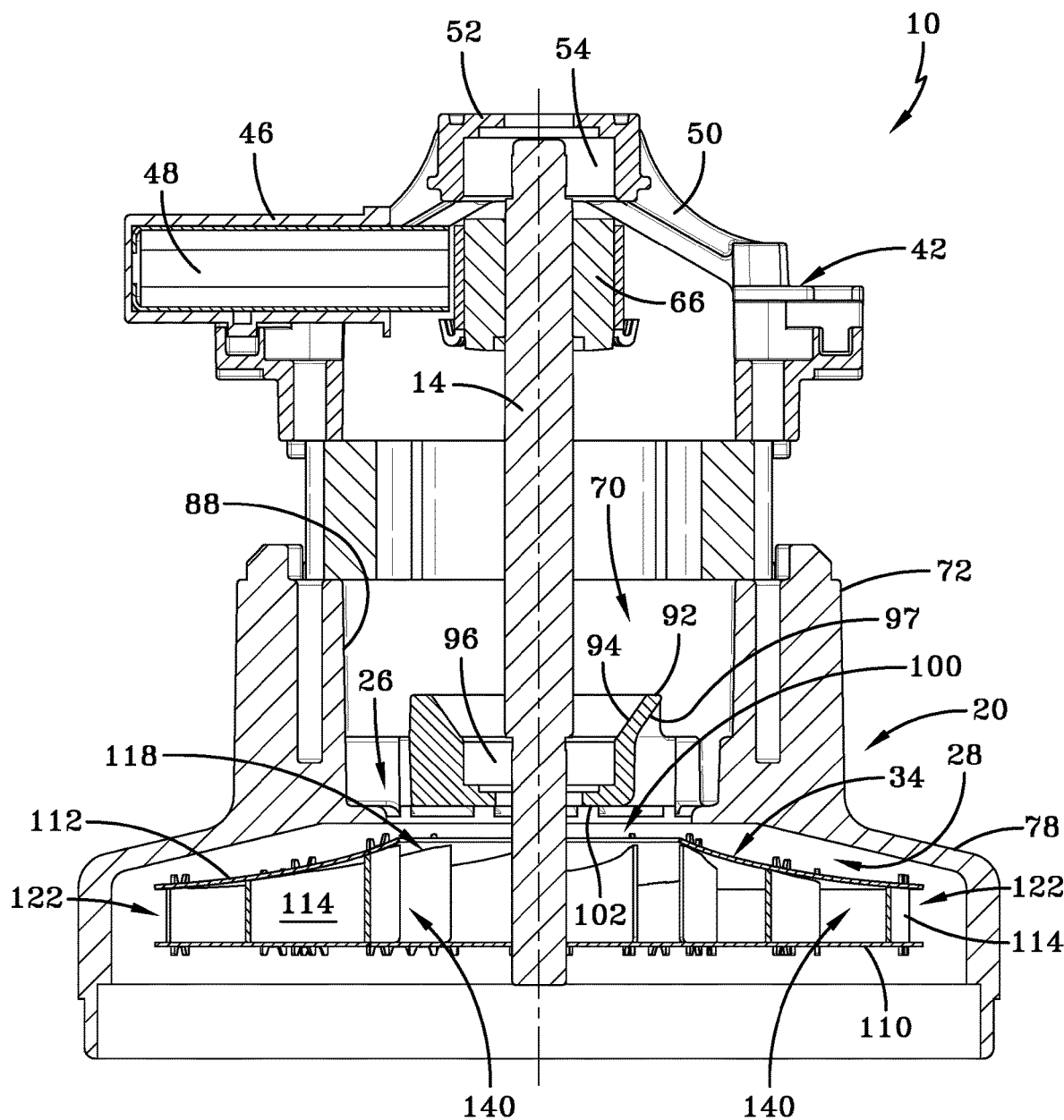
FIG. 5 is a partial cross-sectional view of the vacuum motor, with selected components removed, according to the concepts of the present invention.
Figure 6:
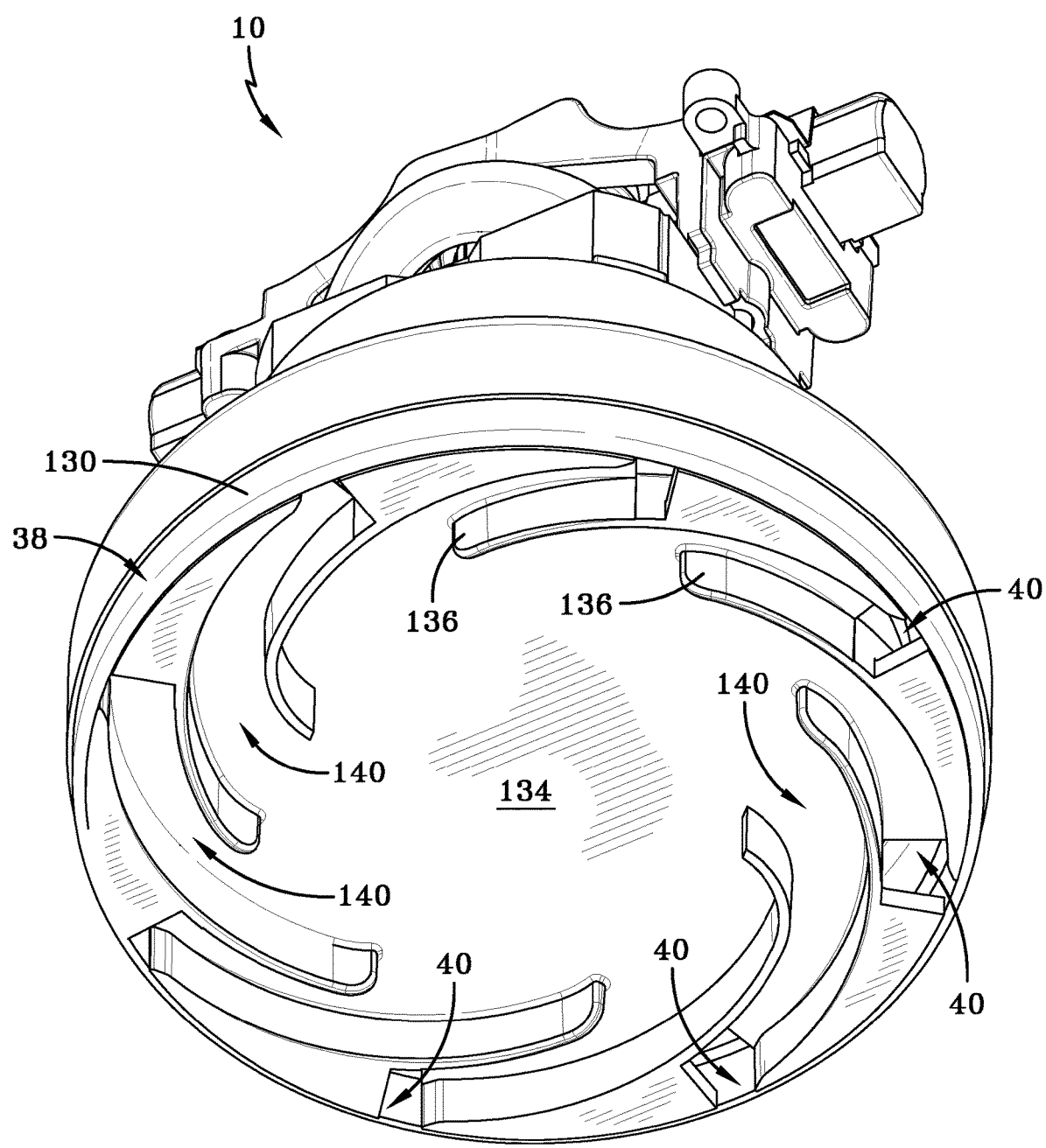
FIG. 6 is a bottom perspective view of the throughflow vacuum motor according the concepts of the present invention.

Referring now to FIGS. 1, 4, and 5, it can be seen that the fan assembly is designated generally by the numeral 34. The fan assembly includes an end plate 110 which is connected at its center to the shaft 14. As a result, the end plate 110 and the fan assembly 34 rotate as the shaft rotates. A tapered eye plate 112 is connected to the end plate 110 by a plurality of blade vanes 114. The blade vanes 114 may be tapered and curvilinear, although other shapes and orientation may be used. The tapered eye plate 112 includes a fan inlet 118 which is sized to be substantially the same as or slightly larger in diameter than the segmented circular passage 100 and is also axially aligned therewith. As best seen in FIG. 5, the profile of the tapered eye plate 112, with respect to the end plate 110, progressively narrows from the fan inlet 118 toward its outer diameter. A plurality of fan passages 120 are formed by the opposed plates 110 and 112 and the adjacent blade vanes 114. Accordingly, as the fan assembly 34 is rotated by the motor assembly, ambient air is drawn across the components of the motor assembly for cooling purposes and the cooling airflow then passes through the passages 26 and is directed into the fan assembly through the fan inlet 118. The cooling airflow is then dispersed radially through the fan passages 120 and exhausted out fan outlets 122 which are formed by the fan passages 120. In particular, the air expelled by the fan assembly 34 is exhausted into the fan chamber 28.

Referring now to FIGS. 1 and 4-6, it can be seen that the diffuser end plate 38 is connected to and encloses the fan chamber 28. The diffuser end plate 38 includes a sidewall 130 which separates a fan side 132, which faces the fan assembly 34, from a diffuser side 134, which faces away from the motor assembly 12. Disposed about the outer periphery of the diffuser end plate 38 are a plurality of plate openings 40 which extend from the diffuser side 134 to the fan side 132. The diffuser side 134 includes a plurality of diffuser vanes 136 which partially extend from the sidewall 130 and are truncated before extending all the way to the axial center of the end plate 38. The diffuser vanes 136 are substantially the same height as the sidewall 130, although they could be of different heights. Adjacent diffuser vanes 136 form a corresponding curved channel 140 therebetween. The vanes 136 are aligned so as to be on either side of each plate opening. Accordingly, as the air is radially dispersed from the fan assembly 34, it flows through the plate openings 40 whereupon the diffuser vanes 136 guide the air radially inward toward the center of the diffuser side 134 whereupon the airflow is directed to ambient. Although the diffuser vanes 136 are shown as curvilinear in FIGS. 1 and 6, skilled artisans will appreciate that in other embodiments the vanes 136 may be straight or angled while still extending radially. And in other embodiments, the vanes 136 may include any combination of curvilinear, straight, spiral, helical, and/or angled components while fully or partially extending from the sidewall 130 toward the axial center of the end plate 38.

From the foregoing construction, it is readily apparent that the airflow through the motor assembly is directed efficiently with minimal turbulence so as to provide maximum cooling of the motor assembly while reducing noise and minimizing energy consumption. Upon rotation of the motor shaft 14 by the motor assembly, ambient air is drawn into the housing 20 such that it enters the geometry of the motor assembly 12 and, in particular, the housing opening 70. This cooling air is directed over the heat generating components of the motor assembly such as the stator and rotor laminations and the associated windings. After passing through the motor assembly, the now heated air is directed against the partition 90 whereupon it impacts the internal guide vanes 24 and collected into the guide passages 99 which direct the airflow inwardly toward the fame bearing collar so as to provide a further heat reduction of the associated bearing. The guide passages 99 then direct the airflow through the flow passages 26 and, in particular, through the segmented circular passage 100. The segmented circular passage is sized to be aligned with the fan inlet 118 whereupon rotation of that fan directs the heated air into the fan passages 120 where it is expelled radially into the fan chamber 28. Subsequently this air is directed through the plate openings 40 where the air is then directed by the diffuser vanes 136 through the correspondingly shaped channels 140. This allows for efficient exhausting of the heated air away from the motor assembly.

Based on the foregoing, the advantages of the present invention are readily apparent. In particular, the air is first drawn in across the motor assembly so that cooling air, instead of heated air as in the prior art, is directed over the motor assembly. This heated air is then internally guided through the housing 20. This is advantageous in that the air is efficiently guided into the rotating fan assembly after having encountering any peculiar geometries provided by the motor assembly. Skilled artisans will appreciate that the vanes may be shaped and configured to accommodate the airflow based on the peculiar geometry of the motor assembly. In any event, the airflow is then expelled by the tapered fan assembly and then efficiently exhausted by the diffuser end plate 38. Such a configuration allows for the motor size, and in particular the amount of copper in the windings and steel in the laminations, to be reduced in size and weight, which results in a cost savings. Additionally, by having the motor run in a cooler and more efficient manner, the need for having thermal sensors associated with the motor assembly if a heat overload situation is detected is eliminated, further reducing the cost of the motor assembly.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A throughflow motor assembly, comprising:
   a motor assembly having a rotatable shaft and a predetermined geometry;
   a housing having said motor assembly mounted to one end thereof, said housing having a housing opening therethrough;
   a fan assembly rotated by said rotatable shaft and received in said housing at an end opposite said motor assembly;
   said housing having an internal collar wall and a partition which partitions said fan assembly and said motor assembly from one another, said partition extending radially from said internal collar wall and having at least one centrally located flow passage extending therethrough;
   a plurality of guide vanes extending radially from said internal collar wall and axially from said partition; and
   said fan assembly drawing air over said predetermined geometry of said motor assembly in a turbulent flow, and then through said housing opening where the air is impacted against said plurality of guide vanes to thereby stabilize the air and transform the air from the turbulent flow to a laminar flow, and then through said at least one centrally located flow passage, and then into said fan assembly which exhausts the air.

2. The assembly according to claim 1, said housing further comprising a mounting collar having the internal collar wall, the assembly further comprising:
   said plurality of guide vanes extending radially from said internal collar wall to a centrally located partition bearing collar carried by said partition, wherein said laminar flow is a substantially cylindrical laminar flow.

3. The assembly according to claim 2, wherein said fan assembly has a fan inlet axially aligned with said at least one centrally located flow passage.

4. The assembly according to claim 3,
   said centrally located partition bearing collar having a tapered outer surface, said plurality of guide vanes extending from said tapered outer surface to assist in guiding the air.

5. The assembly according to claim 4, wherein said plurality of guide vanes are radially curvilinear.

6. The assembly according to claim 4, further comprising:
   a diffuser end plate connected to said housing and forming a fan chamber which receives said fan assembly, said diffuser end plate having a plurality of plate openings extending therethrough and disposed about an outer periphery thereof, wherein air exhausted radially by said fan assembly passes through said plurality of plate openings.

7. The assembly according to claim 6, further comprising:
a plurality of diffuser vanes extending from said diffuser end plate in a direction away from said housing, each said diffuser vane aligned with a corresponding one of said plate openings.

8. The assembly according to claim 6, wherein said plurality of diffuser vanes partially extend from a side wall of said diffuser end plate toward a center of said diffuser end plate.

9. The assembly according to claim 1, further comprising:
said plurality of guide vanes radially extending from said internal collar wall to said at least one centrally located flow passage, wherein said laminar flow is a substantially cylindrical laminar flow; and
a diffuser end plate connected to said housing and forming a fan chamber which receives said fan assembly, said diffuser end plate having a plurality of plate openings extending therethrough and disposed about an outer periphery thereof, wherein air exhausted radially by said fan assembly passes through said plurality of plate openings.

10. The assembly of claim 9, further comprising:
a plurality of diffuser vanes extending from said diffuser end plate in a direction away from said housing, each said diffuser vane aligned with a corresponding one of said plate openings.

11. The assembly according to claim 10, wherein at least one of said plurality of guide vanes and said plurality of diffuser vanes are radially curvilinear.

12. A throughflow motor assembly, comprising:
a motor assembly having a shaft and a predetermined geometry;
a housing having said motor assembly carried at one end thereof, said housing having a housing opening therethrough;
a fan assembly rotated by said shaft and carried by said housing at an end opposite said motor assembly, said housing having a partition which separates said fan assembly from said motor assembly in said housing, said partition having a passage therethrough, said partition extending radially from an inner portion of said housing;
a diffuser end plate connected to said housing and forming a fan chamber which receives said fan assembly, said diffuser end plate having a plurality of plate openings extending therethrough and disposed about an outer periphery thereof; and
a plurality of guide vanes extending axially from said partition, said plurality of guide vanes extending radially between said inner portion of said housing and a centrally located partition bearing collar carried by said partition;
wherein rotation of said fan assembly draws air over said predetermined geometry of said motor assembly in a turbulent flow, and then through said housing opening where the air is impacted against the plurality of guide vanes to thereby stabilize the air and transform the air from the turbulent flow to a laminar flow, and then through said passage, and then through said plurality of plate openings which exhaust the air.

13. The assembly according to claim 12, wherein said laminar flow is a substantially cylindrical laminar flow.

14. The assembly according to claim 13, wherein said fan assembly has a fan inlet axially aligned with said passage.

15. The assembly according to claim 14, further comprising:
said centrally located partition bearing collar having a tapered outer surface, said plurality of guide vanes extending from said tapered outer surface to assist in guiding the air.

16. The assembly according to claim 13, wherein said plurality of guide vanes are radially curvilinear.

17. The assembly of claim 13, further comprising:
a plurality of diffuser vanes extending from said diffuser end plate in a direction away from said housing, each said diffuser vane aligned with a corresponding one of said plate openings.

18. The assembly according to claim 12, wherein said laminar flow is a substantially cylindrical laminar flow; and
said assembly further comprising a plurality of diffuser vanes extending from said diffuser end plate in a direction away from said housing, each said diffuser vane aligned with a corresponding one of said plate openings.

19. The assembly according to claim 18, wherein at least one of said plurality of guide vanes and said plurality of diffuser vanes are radially curvilinear.

* * * * *